US010815323B2

(12) United States Patent
Hirokami

(10) Patent No.: US 10,815,323 B2
(45) Date of Patent: Oct. 27, 2020

(54) SILANE-MODIFIED POLYMER, RUBBER COMPOUNDING INGREDIENT, AND RUBBER COMPOSITION

(71) Applicant: SHIN-ETSU CHEMICAL CO., LTD., Tokyo (JP)

(72) Inventor: Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 59 days.

(21) Appl. No.: 15/691,222

(22) Filed: Aug. 30, 2017

(65) Prior Publication Data

US 2018/0066085 A1    Mar. 8, 2018

(30) Foreign Application Priority Data

Sep. 7, 2016   (JP) .................. 2016-174718

(51) Int. Cl.
| | |
|---|---|
| *C08F 136/08* | (2006.01) |
| *C08C 19/25* | (2006.01) |
| *C08K 5/548* | (2006.01) |
| *C08F 36/08* | (2006.01) |
| *C08F 236/08* | (2006.01) |

(52) U.S. Cl.
CPC ............ *C08F 136/08* (2013.01); *C08C 19/25* (2013.01); *C08F 36/08* (2013.01); *C08F 236/08* (2013.01); *C08K 5/548* (2013.01)

(58) Field of Classification Search
CPC .................................... C08C 19/25
See application file for complete search history.

(56) References Cited

U.S. PATENT DOCUMENTS

| | | | | |
|---|---|---|---|---|
| 3,881,536 | A | * | 5/1975 | Doran, Jr. ............... C08C 19/25 152/209.1 |
| 4,381,377 | A | * | 4/1983 | Kampf ................... C08C 19/25 525/375 |
| 6,191,220 | B1 | | 2/2001 | Takei et al. |
| 6,229,036 | B1 | | 5/2001 | Batz-Sohn et al. |
| 6,414,061 | B1 | | 7/2002 | Cruse et al. |
| 6,777,569 | B1 | | 8/2004 | Westmeyer et al. |
| 7,199,256 | B2 | | 4/2007 | Yanagisawa et al. |
| 7,217,751 | B2 | | 5/2007 | Durel et al. |
| 7,423,165 | B2 | | 9/2008 | Korth et al. |
| 2016/0369015 | A1 | | 12/2016 | Doring et al. |

FOREIGN PATENT DOCUMENTS

| | | |
|---|---|---|
| EP | 0 658 575 A2 | 6/1995 |
| EP | 2 857 407 A2 | 4/2015 |
| GB | 1 439 247 A | 6/1976 |
| JP | 51-020208 B2 | 6/1976 |
| JP | 62-265301 A | 11/1987 |
| JP | 2000-344948 A | 12/2000 |
| JP | 2001-131464 A | 5/2001 |
| JP | 2002-145890 A | 5/2002 |
| JP | 2003-64104 A | 3/2003 |
| JP | 2004-018511 A | 1/2004 |
| JP | 2004-525230 A | 8/2004 |
| JP | 2005-008639 A | 1/2005 |
| JP | 2008-150546 A | 7/2008 |
| JP | 2010-132604 A | 6/2010 |
| JP | 4571125 B2 | 10/2010 |
| JP | 5899050 B2 | 4/2016 |
| WO | WO 2015/086039 A1 | 6/2015 |

OTHER PUBLICATIONS

Machine translation of JP 2003-064104 (A), published Mar. 5, 2003. (Year: 2003).*
Extended European Search Report dated Jan. 4, 2018, in European Patent Application No. 17188695.5.

* cited by examiner

*Primary Examiner* — Vickey Nerangis
(74) *Attorney, Agent, or Firm* — Birch, Stewart, Kolasch & Birch, LLP

(57) ABSTRACT

A silane-modified polymer having a polyisoprene skeleton and a hydrolyzable silyl group is useful as a rubber compounding ingredient. When added to a rubber composition, it is effective for improving the wet grip and substantially reducing the hysteresis loss of the cured rubber composition. Low fuel consumption tires may be manufactured from the rubber composition.

9 Claims, No Drawings

SILANE-MODIFIED POLYMER, RUBBER COMPOUNDING INGREDIENT, AND RUBBER COMPOSITION

CROSS-REFERENCE TO RELATED APPLICATION

This non-provisional application claims priority under 35 U.S.C. § 119(a) on Patent Application No. 2016-174718 filed in Japan on Sep. 7, 2016, the entire contents of which are hereby incorporated by reference.

TECHNICAL FIELD

This invention relates to a silane-modified polymer as well as a rubber compounding ingredient and rubber composition comprising the same. More particularly, it relates to a silane-modified polymer of polybutadiene or polystyrene skeleton, a method for preparing the same, a rubber compounding ingredient and rubber composition comprising the same, and a tire obtained from the rubber composition.

BACKGROUND ART

Sulfur-containing organosilicon compounds are useful as an essential component when tires are produced from silica-filled rubber compositions. Silica-filled tires show excellent performance in the automotive application, especially wear resistance, rolling resistance and wet grip. Since these performance improvements are closely related to a saving of fuel consumption of tires, active efforts are currently devoted thereto.

An increase of silica loading in rubber composition is essential for a saving of fuel consumption. The silica-filled rubber compositions are effective for reducing rolling resistance and improving wet grip of tires, but have drawbacks including a high unvulcanized viscosity, multi-stage milling, and inefficient working. Therefore, rubber compositions simply loaded with inorganic fillers like silica suffer from problems like poor dispersion of the filler and substantial drops of rupture strength and wear resistance. Under the circumstances, it is desired to improve the dispersion of inorganic filler in rubber, and sulfur-containing organosilicon compounds are essential for establishing chemical bonds between the filler and the rubber matrix. See Patent Document 1.

As the sulfur-containing organosilicon compound, compounds containing an alkoxysilyl group and polysulfidesilyl group in the molecule, for example, bis-triethoxysilylpropyltetrasulfide and bis-triethoxysilylpropyldisulfide are known effective from Patent Documents 2 to 5.

In addition to the polysulfide-containing organosilicon compounds mentioned above, it is also known from Patent Documents 6 to 10 to apply a capped mercapto-containing organosilicon compound of thio ester type (advantageous for silica dispersion) and a sulfur-containing organosilicon compound of the type resulting from transesterification of an aminoalcohol compound to a hydrolyzable silyl group which is advantageous to affinity to silica via hydrogen bond.

Further, Patent Documents 11 to 13 disclose silane-modified polybutadiene compounds, but not silane-modified polyisoprene compounds. Patent Document 14 describes polyisoprene compounds which are modified with a silane, specifically mercapto-containing organosilicon compound. When these compounds are used, no satisfactory tire physical properties are developed in some compounding systems.

CITATION LIST

Patent Document 1: JP-B S51-20208
Patent Document 2: JP-A 2004-525230
Patent Document 3: JP-A 2004-018511
Patent Document 4: JP-A 2002-145890
Patent Document 5: U.S. Pat. No. 6,229,036
Patent Document 6: JP-A 2005-008639
Patent Document 7: JP-A 2008-150546
Patent Document 8: JP-A 2010-132604
Patent Document 9: JP 4571125
Patent Document 10: U.S. Pat. No. 6,414,061
Patent Document 11: JP-A S62-265301
Patent Document 12: JP-A 2000-344948
Patent Document 13: JP-A 2001-131464
Patent Document 14: JP 5899050

SUMMARY OF INVENTION

An object of the invention is to provide a silane-modified polymer which when added to a rubber composition, is effective for improving the wet grip and substantially reducing the hysteresis loss of the cured rubber composition, so that desired low fuel consumption tires may be manufactured from the rubber composition. Other objects are to provide a method for preparing the silane-modified polymer, a rubber compounding ingredient comprising the silane-modified polymer, a rubber composition comprising the rubber compounding ingredient, and a tire obtained from the rubber composition.

The inventor has found that a silane-modified polymer of polyisoprene skeleton is an effective rubber compounding ingredient in that when added to a rubber composition, it is effective for substantially reducing the hysteresis loss of the cured rubber composition. Tires obtained from the rubber composition comprising the rubber compounding ingredient exhibits the desired wet grip and achieves a substantial saving of fuel consumption.

In one aspect, the invention provides a silane-modified polymer comprising constituent units of at least one type selected from units having the formulae (1) and (2).

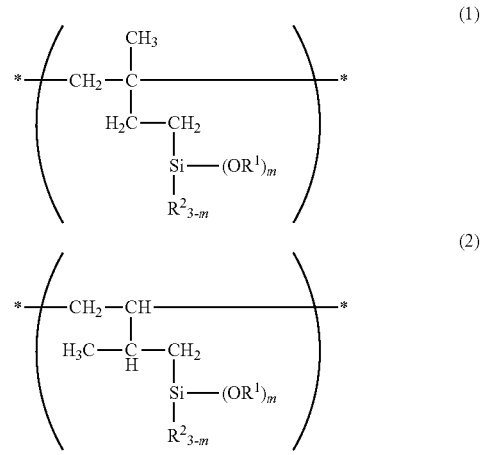

Herein * designates a bond to an adjoining unit, $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, and m is an integer of 1 to 3.

In another aspect, the invention provides a method for preparing the silane-modified polymer defined above, comprising the step of effecting hydrosilylation reaction of a polymer comprising constituent units of at least one type selected from units having the formulae (3) and (4):

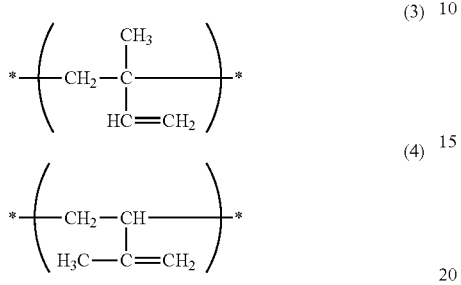

wherein * has the same meaning as above, with an organosilicon compound having the formula (5):

wherein $R^1$, $R^2$ and m are as defined above, in the presence of a platinum compound-containing catalyst or a platinum compound-containing catalyst and a co-catalyst.

In a further aspect, the invention provides a rubber compounding ingredient comprising the silane-modified polymer defined above.

The rubber compounding ingredient may further comprise a sulfide-containing organosilicon compound and/or at least one powder. A total content (A) of the silane-modified polymer and the sulfide-containing organosilicon compound and a content (B) of the powder are in a weight ratio (A/B) of from 70/30 to 5/95.

In a still further aspect, the invention provides a rubber composition comprising the rubber compounding ingredient defined above.

A tire obtained by molding the rubber composition is also provided.

Throughout the specification, the asterisk (*) in the chemical formula designates a bond to an adjoining unit.

Advantageous Effects of Invention

The silane-modified polymer having a polyisoprene skeleton and a hydrolyzable silyl group is useful as a rubber compounding ingredient. Tires obtained from the rubber composition comprising the rubber compounding ingredient meet the desired low fuel consumption tire characteristics.

DESCRIPTION OF PREFERRED EMBODIMENTS

One embodiment of the invention is a silane-modified polymer comprising constituent units of at least one type selected from units having the formulae (1) and (2).

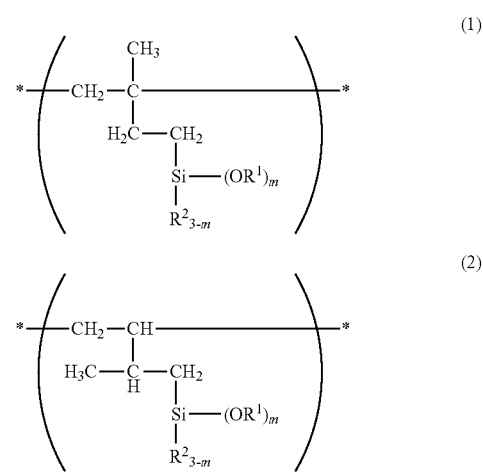

Herein $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, and m is an integer of 1 to 3.

Suitable $C_1$-$C_{10}$ alkyl groups may be straight, branched or cyclic and include methyl, ethyl, n-propyl, i-propyl, n-butyl, s-butyl, t-butyl, n-pentyl, n-hexyl, n-heptyl, n-octyl, n-nonyl, n-decyl, cyclopropyl, cyclobutyl, cyclopentyl, cyclohexyl, cycloheptyl, and cyclooctyl. Suitable $C_6$-$C_{10}$ aryl groups include phenyl, α-naphthyl and β-naphthyl. Among others, $R^1$ is preferably a straight alkyl group, more preferably methyl or ethyl. Also $R^2$ is preferably a straight alkyl group, more preferably methyl or ethyl.

In addition to the constituent units of formula (1) and/or (2), the silane-modified polymer may comprise constituent units of at least one type selected from units having the formulae (3), (4), (6) and (7), and further styrene constituent units having the formula (8). The arrangement of constituent units is arbitrary.

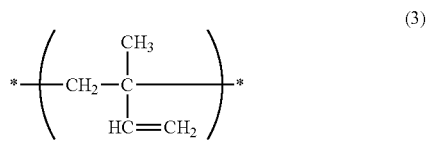

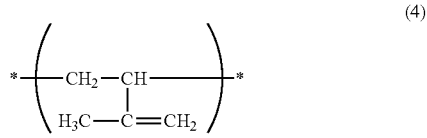

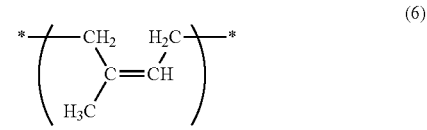

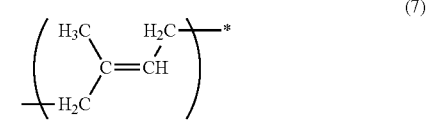

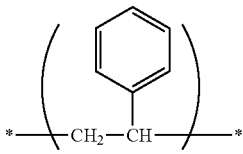
(8)

For the purposes of improving properties of the rubber composition, preventing the composition from viscosity build-up, and making the composition easy to handle, the silane-modified polymer should preferably have a number average molecular weight (Mn) of 5,000 to 200,000, more preferably 5,000 to 100,000, as measured versus polystyrene standards by gel permeation chromatography (GPC).

In order for the silane-modified polymer to be effective for improving properties of the rubber composition, it is preferred that constituent units of at least one type selected from units having formulae (1) and (2) be included in an amount of at least 0.5 mol %, more preferably at least 1 mol % of the overall units of the silane-modified polymer.

The silane-modified polymer may be prepared by effecting hydrosilylation reaction of a polymer comprising constituent units of at least one type selected from units having the formulae (3) and (4) with an organosilicon compound having the formula (5) in the presence of a platinum compound-containing catalyst, preferably in the presence of a platinum compound-containing catalyst and a co-catalyst.

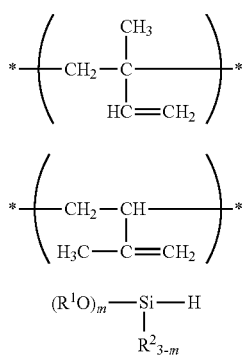

Herein * has the same meaning as above, and $R^1$, $R^2$ and m are as defined above.

The polymer comprising constituent units of at least one type selected from units having the formulae (3) and (4) is commercially available. For example, isoprene homopolymers are available under the trade name of KL-10, LIR-15, LIR-30 and LIR-50 from Kuraray Co., Ltd. Styrene-isoprene copolymers are available under the trade name of LIR-310 from Kuraray Co., Ltd.

Examples of the organosilicon compound having formula (5) include trimethoxysilane, triethoxysilane, dimethoxymethylsilane, and diethoxymethylsilane.

The platinum compound-containing catalyst used in hydrosilylation reaction is not particularly limited. Suitable catalysts include chloroplatinic acid, alcohol solutions of chloroplatinic acid, toluene and xylene solutions of platinum-1,3-divinyl-1,1,3,3-tetramethyldisiloxane complex, tetrakistriphenylphosphine platinum, dichlorobistriphenylphosphine platinum, dichlorobisacetonitrile platinum, dichlorobisbenzonitrile platinum, and dichlorocyclooctadiene platinum, as well as supported catalysts such as platinum-on-carbon, platinum-on-alumina and platinum-on-silica. In view of selectivity upon hydrosilylation, zerovalent platinum complexes are preferred, with toluene and xylene solutions of platinum-1,3-divinyl-1,1,3,3-tetramethyldisiloxane complex being more preferred.

The amount of the platinum compound-containing catalyst used is not particularly limited. In view of reactivity and productivity, the catalyst is preferably used in an amount to provide $1 \times 10^{-8}$ to $1 \times 10^{-2}$ mole, more preferably $1 \times 10^{-7}$ to $1 \times 10^{-3}$ mole of platinum atom per mole of the organosilicon compound having formula (5).

If necessary, a co-catalyst may be used to increase the rate of hydrosilylation reaction. The co-catalyst is preferably selected from ammonium salts of inorganic acids, acid amide compounds, carboxylic acids, and mixtures thereof. Suitable ammonium salts of inorganic acids include ammonium chloride, ammonium sulfate, ammonium amidosulfonate, ammonium nitrate, monoammonium dihydrogenphosphate, diammonium hydrogenphosphate, triammonium phosphate, ammonium hypophosphite, ammonium carbonate, ammonium hydrogencarbonate, ammonium sulfide, ammonium borate, and ammonium borofluoride. Inter alia, ammonium salts of inorganic acids having pKa of at least 2 are preferred, with ammonium carbonate and ammonium hydrogencarbonate being most preferred.

Suitable acid amide compounds include formamide, acetamide, N-methylacetamide, N,N-dimethylacetamide, propionamide, acrylamide, malonamide, succinamide, maleamide, fumaramide, benzamide, phthalamide, palmitamide, and stearamide.

Suitable carboxylic acids include formic acid, acetic acid, propionic acid, butyric acid, methoxyacetic acid, pentanoic acid, caproic acid, heptanoic acid, octanoic acid, lactic acid, and glycolic acid. Inter alia, formic acid, acetic acid and lactic acid are preferred, with acetic acid being most preferred.

The amount of the co-catalyst used is not particularly limited. In view of reactivity, selectivity and cost, the co-catalyst is preferably used in an amount of $1 \times 10^{-5}$ to $1 \times 10^{-1}$ mole, more preferably $1 \times 10^{-4}$ to $5 \times 10^{-1}$ mole per mole of the organosilicon compound having formula (5).

A solvent may be used although the reaction takes place in a solventless system. Suitable solvents include hydrocarbon solvents such as pentane, hexane, cyclohexane, heptane, isooctane, benzene, toluene, and xylene, ether solvents such as diethyl ether, tetrahydrofuran, and dioxane, ester solvents such as ethyl acetate and butyl acetate, aprotic polar solvents such as N,N-dimethylformamide, and chlorinated hydrocarbon solvents such as dichloromethane and chloroform, which may be used alone or in admixture.

Although the temperature for hydrosilylation reaction is not particularly limited, it is preferably 0° C. to an elevated temperature, more preferably 0 to 200° C. An elevated temperature is preferred for gaining an appropriate reaction rate. In this sense, the reaction temperature is preferably 40 to 110° C., more preferably 40 to 90° C. Although the reaction time is not particularly limited, it is preferably 1 to about 60 hours, more preferably 1 to 30 hours, and even more preferably 1 to 20 hours.

Another embodiment of the invention is a rubber compounding ingredient comprising the silane-modified polymer defined above.

The rubber compounding ingredient may further comprise a sulfide-containing organosilicon compound which may be effective for improving tire physical properties. Suitable sulfide-containing organosilicon compounds include bis(trimethoxysilylpropyl)tetrasulfide, bis(triethoxysilylpropyl)tetrasulfide, bis(trimethoxysilylpropyl)disulfide, and bis(triethoxysilylpropyl)disulfide, but are not limited thereto. In the rubber compounding ingredient, the silane-modified polymer and the sulfide-containing organosilicon compound are preferably present in a weight ratio of from 5:95 to 80:20, more preferably from 10:90 to 50:50.

Also a mixture of the silane-modified polymer and the sulfide-containing organosilicon compound with at least one powder is useful as the rubber compounding ingredient. Suitable powders include carbon black, talc, calcium carbonate, stearic acid, silica, aluminum hydroxide, alumina, and magnesium hydroxide. Of these, silica and aluminum hydroxide are preferred for reinforcement, with silica being most preferred. In view of ease of handling and transportation cost of the rubber compounding ingredient, a total content (A) of the silane-modified polymer and the sulfide-containing organosilicon compound and a content (B) of the powder are preferably in a weight ratio (A/B) of from 70/30 to 5/95, more preferably from 60/40 to 10/90.

The rubber compounding ingredient may further contain organic polymers and rubbers such as fatty acids, fatty acid salts, polyethylene, polypropylene, polyoxyalkylenes, polyesters, polyurethane, polystyrene, polybutadiene, polyisoprene, natural rubber, and styrene-butadiene copolymers. There may also be added additives for tires and general rubbers such as vulcanizing agents, crosslinking agents, vulcanizing accelerators, crosslinking accelerators, oils, antioxidants, fillers, and plasticizers. The rubber compounding ingredient may take the form of liquid or solid, or be diluted with organic solvents or emulsified.

Typically the rubber compounding ingredient is compounded in filler-containing rubber compositions. Suitable fillers include silica, talc, clay, aluminum hydroxide, magnesium hydroxide, calcium carbonate, and titanium oxide. More preferably, the rubber compounding ingredient is compounded in silica-containing rubber compositions. In view of rubber physical properties, the extent of available effects, and a balance thereof with economy, an amount of the rubber compounding ingredient compounded in a filled rubber composition is preferably selected such that a total amount of the silane-modified polymer and sulfide-containing organosilicon compound is 0.2 to 30 parts, more preferably 1 to 20 parts by weight per 100 parts by weight of the filler. The amount of the filler in a rubber composition may be ordinary as long as the objects of the invention are not impaired.

The rubber serving as a base in a rubber composition to which the rubber compounding ingredient is added may be any of rubbers commonly used in various rubber compositions. Suitable rubbers include natural rubber (NR), diene rubbers such as isoprene rubber (IR), styrene-butadiene copolymer rubbers (SBR), polybutadiene rubbers (BR), and acrylonitrile-butadiene copolymer rubbers (NBR), and non-diene rubbers such as butyl rubber (IIR) and ethylene-propylene copolymer rubbers (EPR, EPDM), which may be used alone or in admixture. The amount of rubber in the rubber composition may be ordinary, typically 20 to 80% by weight, though not limited thereto.

Besides the foregoing components, various additives commonly used in tire and general rubber compositions such as carbon black, vulcanizing agents, crosslinking agents, vulcanizing accelerators, crosslinking accelerators, oils, antioxidants, and plasticizers may also be compounded in the rubber composition. The amounts of the additives may be ordinary as long as the objects of the invention are not impaired.

The rubber composition having the rubber compounding ingredient compounded therein may be prepared by kneading various components by a standard technique, which is ready for use in the manufacture of rubber articles to be vulcanized or crosslinked, typically tires. Especially in manufacturing tires, the rubber composition is preferably used as treads. Since the tires obtained from the rubber composition are significantly reduced in rolling resistance and wear resistance, the desired saving of fuel consumption is achievable. The tire may have any prior art well-known structures and be manufactured by any prior art well-known techniques. In the case of pneumatic tires, the gas introduced therein may be ordinary air, air having a controlled oxygen partial pressure, or an inert gas such as nitrogen, argon or helium.

EXAMPLE

Examples of the invention are given below by way of illustration and not by way of limitation. All parts are by weight (pbw). Mn is a number average molecular weight as measured versus polystyrene standards by gel permeation chromatography (GPC). The viscosity is measured at 25° C. by a rotational viscometer.

1) Preparation of Silane-Modified Polymers

Example 1-1

A 2-L separable flask equipped with a stirrer, reflux condenser, dropping funnel and thermometer was charged with 1,000 g of isoprene homopolymer KL-10 (Mn=10,000, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.03 g ($0.44 \times 10^{-3}$ mol) of acetic acid. At an internal temperature of 75-85° C., 72 g (0.44 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 5,000 mPa·s and a Mn of 10,700. From the $^1$H-NMR spectrum and Mn, the number of constituent units having triethoxysilyl group was computed to be 3 mol % of the overall units.

Example 1-2

A flask as in Example 1-1 was charged with 1,000 g of isoprene homopolymer KL-10 (Mn=10,000, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.03 g ($0.44 \times 10^{-3}$ mol) of ammonium hydrogencarbonate. At an internal temperature of 75-85° C., 72 g (0.44 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 5,000 mPa·s and a Mn of 10,700. From the $^1$H-NMR spectrum and Mn, the number of constituent units having triethoxysilyl group was computed to be 3 mol % of the overall units.

Example 1-3

A flask as in Example 1-1 was charged with 1,000 g of isoprene homopolymer KL-10 (Mn=10,000, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.02 g ($0.44 \times 10^{-3}$ mol) of formamide. At an internal temperature of 75-85° C., 72 g (0.44 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 5,000 mPa·s and a Mn of 10,700. From the $^1$H-NMR spectrum and Mn, the number of constituent units having triethoxysilyl group was computed to be 3 mol % of the overall units.

Example 1-4

A flask as in Example 1-1 was charged with 1,000 g of isoprene homopolymer KL-10 (Mn=10,000, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.03 g ($0.44 \times 10^{-3}$ mol) of acetic acid. At an internal temperature of 75-85° C., 54 g (0.44 mol) of trimethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 5,500 mPa·s and a Mn of 10,500. From the $^1$H-NMR spectrum and Mn, the number of constituent units having triethoxysilyl group was computed to be 3 mol % of the overall units.

Example 1-5

A flask as in Example 1-1 was charged with 1,000 g of isoprene homopolymer LIR-15 (Mn=19,500, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.03 g ($0.44 \times 10^{-3}$ mol) of acetic acid. At an internal temperature of 75-85° C., 72 g (0.44 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 30,000 mPa·s and a Mn of 20,900. From the $^1$H-NMR spectrum and Mn, the number of constituent units having triethoxysilyl group was computed to be 3 mol % of the overall units.

Example 1-6

A flask as in Example 1-1 was charged with 1,000 g of isoprene homopolymer LIR-30 (Mn=28,000, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.03 g ($0.44 \times 10^{-3}$ mol) of acetic acid. At an internal temperature of 75-85° C., 72 g (0.44 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 140,000 mPa·s and a Mn of 30,000. From the $^1$H-NMR spectrum and Mn, the number of constituent units having triethoxysilyl group was computed to be 3 mol % of the overall units.

Example 1-7

A flask as in Example 1-1 was charged with 1,000 g of isoprene homopolymer LIR-50 (Mn=54,000, by Kuraray Co., Ltd.), an amount ($0.44 \times 10^{-3}$ mol of platinum atom) of toluene solution of platinum-1,3-divinyl-1,1,3,3-tetramethyldisiloxane complex, and 0.03 g ($0.44 \times 10^{-3}$ mol) of acetic acid. At an internal temperature of 75-85° C., 72 g (0.44 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 950,000 mPa·s and a Mn of 58,000. From the $^1$H-NMR spectrum and Mn, the number of constituent units having triethoxysilyl group was computed to be 3 mol % of the overall units.

Example 1-8

A flask as in Example 1-1 was charged with 1,000 g of isoprene homopolymer LIR-310 (Mn=32,000, by Kuraray Co., Ltd.), an amount ($0.40 \times 10^{-3}$ mol of platinum atom) of toluene solution of platinum-1,3-divinyl-1,1,3,3-tetramethyldisiloxane complex, and 0.03 g ($0.40 \times 10^{-3}$ mol) of acetic acid. At an internal temperature of 75-85° C., 66 g (0.40 mol) of triethoxysilane was added dropwise over 2 hours to the mixture, which was stirred at 80° C. for a further 1 hour. At the end of stirring, the reaction mixture was concentrated under reduced pressure and filtered, obtaining a yellow transparent liquid having a viscosity of 3,000,000 mPa·s and a Mn of 33,600. From the $^1$H-NMR spectrum and Mn, the number of constituent units having triethoxysilyl group was computed to be 3 mol % of the overall units.

Reference Example 1-1

With reference to JP 5899050, a silane-modified polymer was synthesized as follows. A flask as in Example 1-1 was charged with 1,000 g of isoprene homopolymer LIR-30 (Mn=28,000, by Kuraray Co., Ltd.) and 1,000 g of 3-mercaptopropyltriethoxysilane. The mixture was stirred at 200° C. for 5 hours. At the end of stirring, the reaction mixture was concentrated under reduced pressure and filtered, obtaining a pale yellow transparent liquid having a viscosity of 200,000 mPa·s and a Mn of 59,000.

2) Preparation of Rubber Compositions

Examples 2-1 to 2-3

A master batch was prepared by mixing 110 parts of oil-extended emulsion polymerization SBR #1712 (by JSR Corp.), 20 parts of NR (RSS #3 grade), 20 parts of carbon black (N234 grade), 50 parts of silica (Nipsil AQ by Nippon Silica Industry Co., Ltd.), 6.5 parts of the silane-modified polymer of Example 1-1 or 6.5 parts (total) of the silane-modified polymer plus KBE-846 (bis(triethoxysilylpropyl) tetrasulfide, by Shin-Etsu Chemical Co., Ltd.), 1 part of stearic acid, and 1 part of antioxidant (Nocrac 6C by Ouchi Shinko Chemical Industrial Co., Ltd.).

To the master batch were added 3 parts of zinc white, 0.5 part of a vulcanizing accelerator DM (dibenzothiazyl disulfide), 1 part of a vulcanizing accelerator NS (N-t-butyl-2-benzothiazolylsulfenamide) and 1.5 parts of sulfur. They were kneaded to form a rubber composition.

Examples 2-4 to 2-8

Rubber compositions were prepared as in Example 2-3 aside from replacing the silane-modified polymer of Example 1-1 by the silane-modified polymers of Examples 1-4 to 1-8 as shown in Table 1.

Comparative Example 2-1

A rubber composition was prepared as in Example 2-3 aside from replacing the silane-modified polymer of Example 1-2 by the silane-modified polymer of Reference Example 1-1 as shown in Table 2.

Comparative Example 2-2

A rubber composition was prepared as in Example 2-1 aside from replacing the silane-modified polymer of Example 1-2 by KBE-846 as shown in Table 2.

The rubber compositions of Example 2-1 to 2-8 and Comparative Examples 2-1 to 2-2 were measured for physical properties in unvulcanized and vulcanized states by the following tests. The results are also shown in Tables 1 and 2.

Unvulcanized Physical Properties (1) Mooney Viscosity

According to JIS K6300, measurement was made under conditions: preheating 1 minute, measurement 4 minutes, and temperature 130° C. The measurement result was expressed as an index based on 100 for Comparative Example 2-2. A lower index corresponds to a lower Mooney viscosity and indicates better workability.

Vulcanized Physical Properties (2) Dynamic Viscoelasticity

Using a viscoelasticity meter (Rheometric Scientific Inc.), measurement was made under conditions: tensile dynamic strain 5%, frequency 15 Hz, and 0° C. or 60° C. The test specimen was a sheet of 0.2 cm thick and 0.5 cm wide, the clamp span was 2 cm, and the initial weight was 160 g. The value of tan δ was expressed as an index based on 100 for Comparative Example 2-2. A greater index at 0° C. indicates a better wet grip. A lower index at 60° C. corresponds to a smaller hysteresis loss and lower heat generation.

(3) Wear Resistance

According to JIS K 6264-2:2005, the abrasion test was carried out using a Lambourn abrasion tester at room temperature and slip rate 25%. The measurement result was expressed as an index based on 100 for Comparative Example 2-2. A greater index indicates a smaller abrasion and hence, better wear resistance.

TABLE 1

| Formulation (pbw) | | | 2-1 | 2-2 | 2-3 | 2-4 | 2-5 | 2-6 | 2-7 | 2-8 |
|---|---|---|---|---|---|---|---|---|---|---|
| | | SBR | 110 | 110 | 110 | 110 | 110 | 110 | 110 | 110 |
| | | NR | 20 | 20 | 20 | 20 | 20 | 20 | 20 | 20 |
| | | Carbon black | 20 | 20 | 20 | 20 | 20 | 20 | 20 | 20 |
| | | Silica | 50 | 50 | 50 | 50 | 50 | 50 | 50 | 50 |
| Silane-modified polymer | | Example 1-1 | 6.5 | 3.3 | 1.6 | — | — | — | — | — |
| | | Example 1-4 | — | — | — | 1.6 | — | — | — | — |
| | | Example 1-5 | — | — | — | — | 1.6 | — | — | — |
| | | Example 1-6 | — | — | — | — | — | 1.6 | — | — |
| | | Example 1-7 | — | — | — | — | — | — | 1.6 | — |
| | | Example 1-8 | — | — | — | — | — | — | — | 1.6 |
| | | KBE-846 | — | 3.2 | 4.9 | 4.9 | 4.9 | 4.9 | 4.9 | 4.9 |
| | | Stearic acid | 1 | 1 | 1 | 1 | 1 | 1 | 1 | 1 |
| | | Antioxidant 6C | 1 | 1 | 1 | 1 | 1 | 1 | 1 | 1 |
| | | Zinc white | 3 | 3 | 3 | 3 | 3 | 3 | 3 | 3 |
| | | Vulcanizing accelerator DM | 0.5 | 0.5 | 0.5 | 0.5 | 0.5 | 0.5 | 0.5 | 0.5 |
| | | Vulcanizing accelerator NS | 1 | 1 | 1 | 1 | 1 | 1 | 1 | 1 |
| | | Sulfur | 1.5 | 1.5 | 1.5 | 1.5 | 1.5 | 1.5 | 1.5 | 1.5 |
| Unvulcanized physical properties | Mooney viscosity | | 90 | 92 | 92 | 93 | 93 | 93 | 94 | 94 |
| Vulcanized physical properties | Dynamic viscoelasticity tanδ | 0° C. | 100 | 106 | 107 | 110 | 110 | 109 | 108 | 108 |
| | | 60° C. | 92 | 85 | 85 | 86 | 84 | 88 | 88 | 89 |
| | Wear resistance | | 102 | 106 | 105 | 106 | 104 | 105 | 105 | 106 |

TABLE 2

| Formulation (pbw) | | | Comparative Example 2-1 | Comparative Example 2-2 |
|---|---|---|---|---|
| | SBR | | 110 | 110 |
| | NR | | 20 | 20 |
| | Carbon black | | 20 | 20 |
| | Silica | | 50 | 50 |
| Organosilicon compound | Reference Example 1-1 | | 1.6 | — |
| | KBE-846 | | 4.9 | 4.9 |
| | Stearic acid | | 1 | 1 |
| | Antioxidant 6C | | 1 | 1 |
| | Zinc white | | 3 | 3 |
| | Vulcanizing accelerator DM | | 0.5 | 0.5 |
| | Vulcanizing accelerator NS | | 1 | 1 |
| | Sulfur | | 1.5 | 1.5 |
| Unvulcanized physical properties | Mooney viscosity | | 99 | 100 |
| Vulcanized physical properties | Dynamic viscoelasticity tanδ | 0° C. | 100 | 100 |
| | | 60° C. | 102 | 100 |
| | Wear resistance | | 90 | 100 |

As seen from Tables 1 and 2, the rubber compositions of Examples 2-1 to 2-8 have a lower Mooney viscosity and better workability than the rubber compositions of Comparative Examples 2-1 to 2-2. The vulcanized rubber compositions of Examples 2-1 to 2-8 have a better wet grip performance, lower heat generation, and better wear resistance than the vulcanized rubber compositions of Comparative Examples 2-1 to 2-2.

Examples 2-9 to 2-11

A master batch was prepared by mixing 100 parts of NR (RSS #3 grade), 38 parts of process oil, 5 parts of carbon black (N234 grade), 105 parts of silica (Nipsil AQ by Nippon Silica Industry Co., Ltd.), 8.4 parts of the silane-modified polymer of Example 1-1 or 8.4 parts (total) of the silane-modified polymer plus KBE-846 (bis(triethoxysilyl-propyl)tetrasulfide by Shin-Etsu Chemical Co., Ltd.), 2 parts of stearic acid, and 2 parts of antioxidant (Nocrac 6C by Ouchi Shinko Chemical Industrial Co., Ltd.).

To the master batch were added 2 parts of zinc oxide, 3 parts of a vulcanizing accelerator CZ (Nocceler, N-cyclohexyl-2-benzothiazolylsulfenamide), and 2 parts of sulfur. They were kneaded to form a rubber composition.

Examples 2-12 to 2-16

Rubber compositions were prepared as in Example 2-11 aside from replacing the silane-modified polymer of Example 1-1 by the silane-modified polymers of Examples 1-4 to 1-8 as shown in Table 3.

Comparative Example 2-3

A rubber composition was prepared as in Example 2-11 aside from replacing the silane-modified polymer of Example 1-1 by the silane-modified polymer of Reference Example 1-1 as shown in Table 4.

Comparative Example 2-4

A rubber composition was prepared as in Example 2-9 aside from replacing the silane-modified polymer of Example 1-1 by KBE-846 as shown in Table 4.

The rubber compositions were measured for unvulcanized physical properties (Mooney viscosity) and vulcanized physical properties (dynamic viscoelasticity, wear resistance) by the same tests as above. The measurement results, expressed as an index based on 100 for Comparative Example 2-4, are also shown in Tables 3 and 4.

TABLE 4

| Formulation (pbw) | | | Comparative Example 2-3 | Comparative Example 2-4 |
|---|---|---|---|---|
| | NR | | 100 | 100 |
| | Process oil | | 38 | 38 |
| | Carbon black | | 5 | 5 |
| | Silica | | 105 | 105 |
| Organosilicon compound | Reference Example 1-1 | | 2.1 | — |
| | KBE-846 | | 6.3 | 8.4 |
| | Stearic acid | | 2 | 2 |
| | Antioxidant 6C | | 2 | 2 |
| | Zinc oxide | | 2 | 2 |
| | Vulcanizing accelerator CZ | | 3 | 3 |
| | Sulfur | | 2 | 2 |
| Unvulcanized physical properties | Mooney viscosity | | 99 | 100 |
| Vulcanized physical properties | Dynamic viscoelasticity tanδ | 0° C. | 100 | 100 |
| | | 60° C. | 102 | 100 |
| | Wear resistance | | 95 | 100 |

As seen from Tables 3 and 4, the vulcanized rubber compositions of Examples 2-9 to 2-16 have a lower dynamic viscoelasticity, i.e., lower hysteresis loss and lower heat generation, and better wear resistance than the vulcanized rubber compositions of Comparative Examples 2-3 to 2-4.

Japanese Patent Application No. 2016-174718 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rubber compounding ingredient comprising
a silane-modified isoprene homopolymer or styrene-isoprene copolymer, said silane-modified isoprene homopolymer or styrene-isoprene copolymer having a number average molecular weight (Mn) of 5,000 to

TABLE 3

| Formulation (pbw) | | | | | | Example | | | | |
|---|---|---|---|---|---|---|---|---|---|---|
| | | | 2-9 | 2-10 | 2-11 | 2-12 | 2-13 | 2-14 | 2-15 | 2-16 |
| | NR | | 100 | 100 | 100 | 100 | 100 | 100 | 100 | 100 |
| | Process oil | | 38 | 38 | 38 | 38 | 38 | 38 | 38 | 38 |
| | Carbon black | | 5 | 5 | 5 | 5 | 5 | 5 | 5 | 5 |
| | Silica | | 105 | 105 | 105 | 105 | 105 | 105 | 105 | 105 |
| Silane-modified polymer | Example 1-1 | | 8.4 | 4.2 | 2.1 | — | — | — | — | — |
| | Example 1-4 | | — | — | — | 2.1 | — | — | — | — |
| | Example 1-5 | | — | — | — | — | 2.1 | — | — | — |
| | Example 1-6 | | — | — | — | — | — | 2.1 | — | — |
| | Example 1-7 | | — | — | — | — | — | — | 2.1 | — |
| | Example 1-8 | | — | — | — | — | — | — | — | 2.1 |
| | KBE-846 | | — | 4.2 | 6.3 | 6.3 | 6.3 | 6.3 | 6.3 | 6.3 |
| | Stearic acid | | 2 | 2 | 2 | 2 | 2 | 2 | 2 | 2 |
| | Antioxidant 6C | | 2 | 2 | 2 | 2 | 2 | 2 | 2 | 2 |
| | Zinc oxide | | 2 | 2 | 2 | 2 | 2 | 2 | 2 | 2 |
| | Vulcanizing accelerator CZ | | 3 | 3 | 3 | 3 | 3 | 3 | 3 | 3 |
| | Sulfur | | 2 | 2 | 2 | 2 | 2 | 2 | 2 | 2 |
| Unvulcanized physical properties | Mooney viscosity | | 92 | 93 | 93 | 93 | 93 | 94 | 94 | 94 |
| Vulcanized physical properties | Dynamic viscoelasticity tanδ | 0° C. | 100 | 105 | 106 | 108 | 108 | 109 | 108 | 108 |
| | | 60° C. | 90 | 85 | 83 | 84 | 85 | 85 | 85 | 85 |
| | Wear resistance | | 102 | 106 | 107 | 107 | 106 | 106 | 105 | 105 |

200,000 as measured versus polystyrene standards by gel permeation chromatography (GPC), a sulfide-containing organosilicon compound, and at least one powder selected from the group consisting of talc, calcium carbonate, aluminum hydroxide, alumina, and magnesium hydroxide, wherein a total content (A) of the silane-modified polymer and the sulfide-containing organosilicon compound and a content (B) of the powder are in a weight ratio (AB) of from 70/30 to 5/95, and wherein the isoprene homopolymer or styrene-isoprene copolymer comprises constituent units of at least one type selected from units having the formulae (1) and (2):

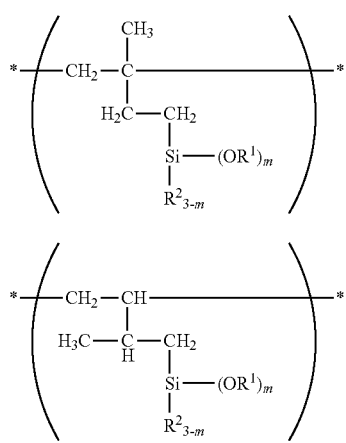

wherein * designates a bond to an adjoining unit, $R^1$ is each independently a $C_1$-$C_{10}$ alkyl group or $C_6$-$C_{10}$ aryl group, $R^2$ is each independently a $C_1$-$C_{10}$ alkyl group or $C_6$-$C_{10}$ aryl group, and m is an integer of 1 to 3.

2. The rubber compounding ingredient of claim 1, wherein the silane-modified isoprene homopolymer or styrene-isoprene copolymer has a number average molecular weight (Mn) of 5,000 to 100,000, as measured versus polystyrene standards by gel permeation chromatography (GPC).

3. The rubber compounding ingredient of claim 1, wherein the silane-modified isoprene homopolymer or styrene-isoprene copolymer comprises the constituent units selected from units having formulae (1) and (2) in an amount of at least 0.5 mol %, of the overall units of the silane-modified isoprene homopolymer or styrene-isoprene copolymer.

4. The rubber compounding ingredient of claim 3, wherein the silane-modified isoprene homopolymer or styrene-isoprene copolymer comprises the constituent units selected from units having formulae (1) and (2) in an amount of at least 1 mol %, of the overall units of the silane-modified isoprene homopolymer or styrene-isoprene copolymer.

5. The rubber compounding ingredient of claim 1, wherein the silane-modified isoprene homopolymer or styrene-isoprene copolymer comprises constituent units of one or more types selected from units having the formulae (3), (4), (6) and (7), and/or styrene constituent units having the formula (8):

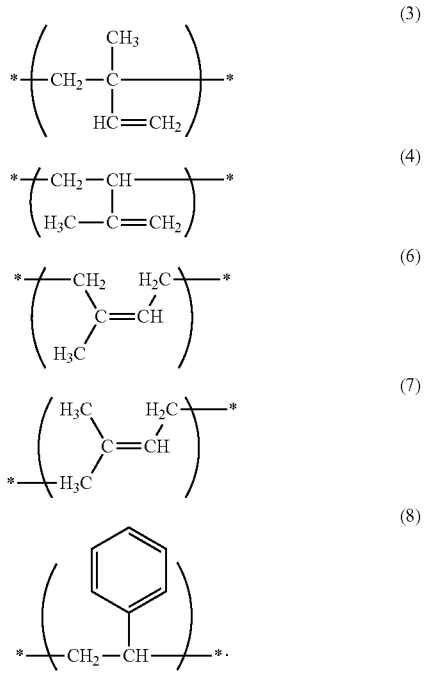

6. A rubber composition comprising the rubber compounding ingredient of claim 1.

7. A tire obtained by molding the rubber composition of claim 6.

8. The rubber composition of claim 6 in which a base rubber is selected from natural rubber (NR), diene rubbers such as isoprene rubbers (IR), styrene-butadiene copolymer rubbers (SBR), polybutadiene rubbers (BR) and acrylonitrile-butadiene copolymer rubbers (NBR), and non-diene rubbers selected from butyl rubbers (IIR) and ethylene-propylene copolymer rubbers (EPR, EPDM), which may be used alone or in admixture.

9. A rubber compounding method comprising incorporating a rubber compounding ingredient of claim 1 into a rubber.

* * * * *